Dec. 4, 1934.  V. P. WILLIAMS  1,982,775
BUMPER
Filed May 7, 1934  3 Sheets-Sheet 3
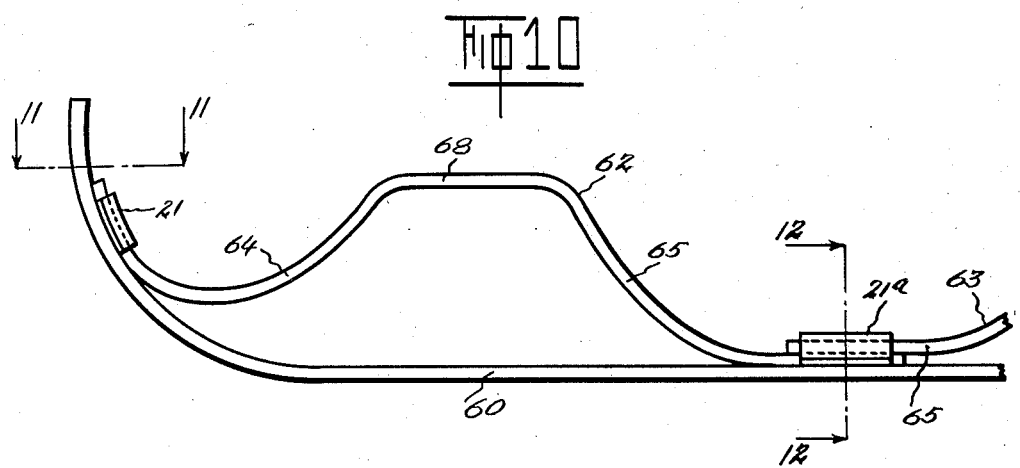
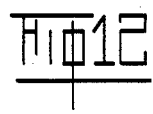
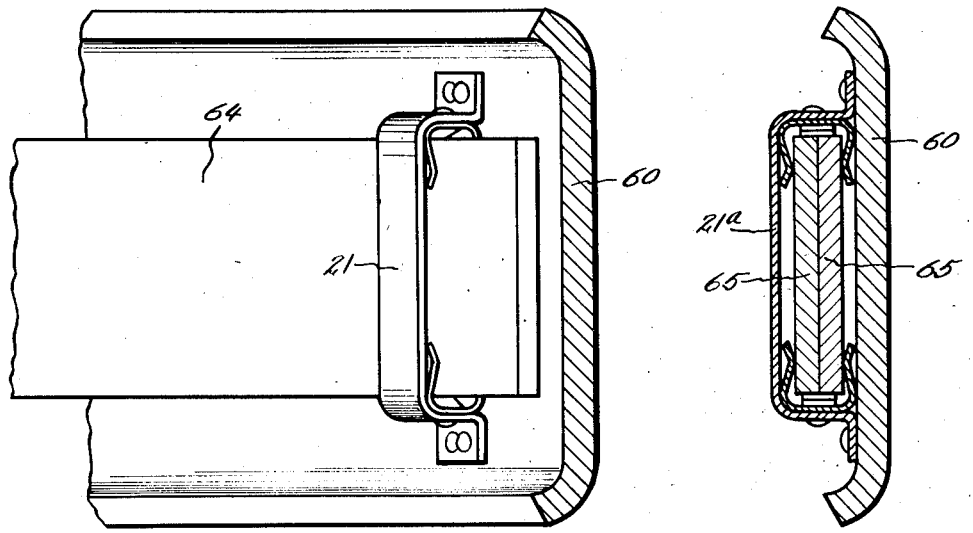
Inventor
Victor P. Williams Patented Dec. 4, 1934

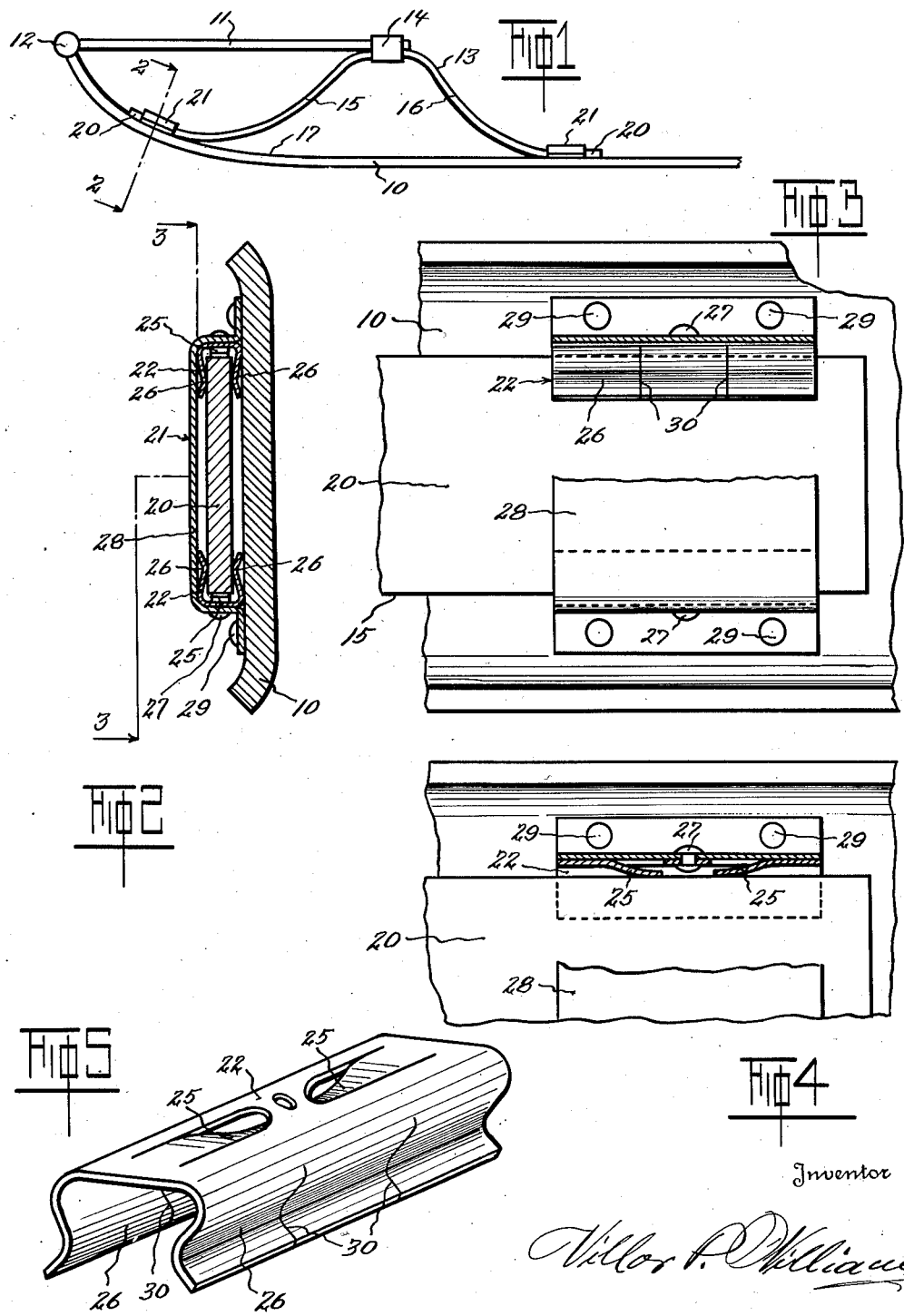

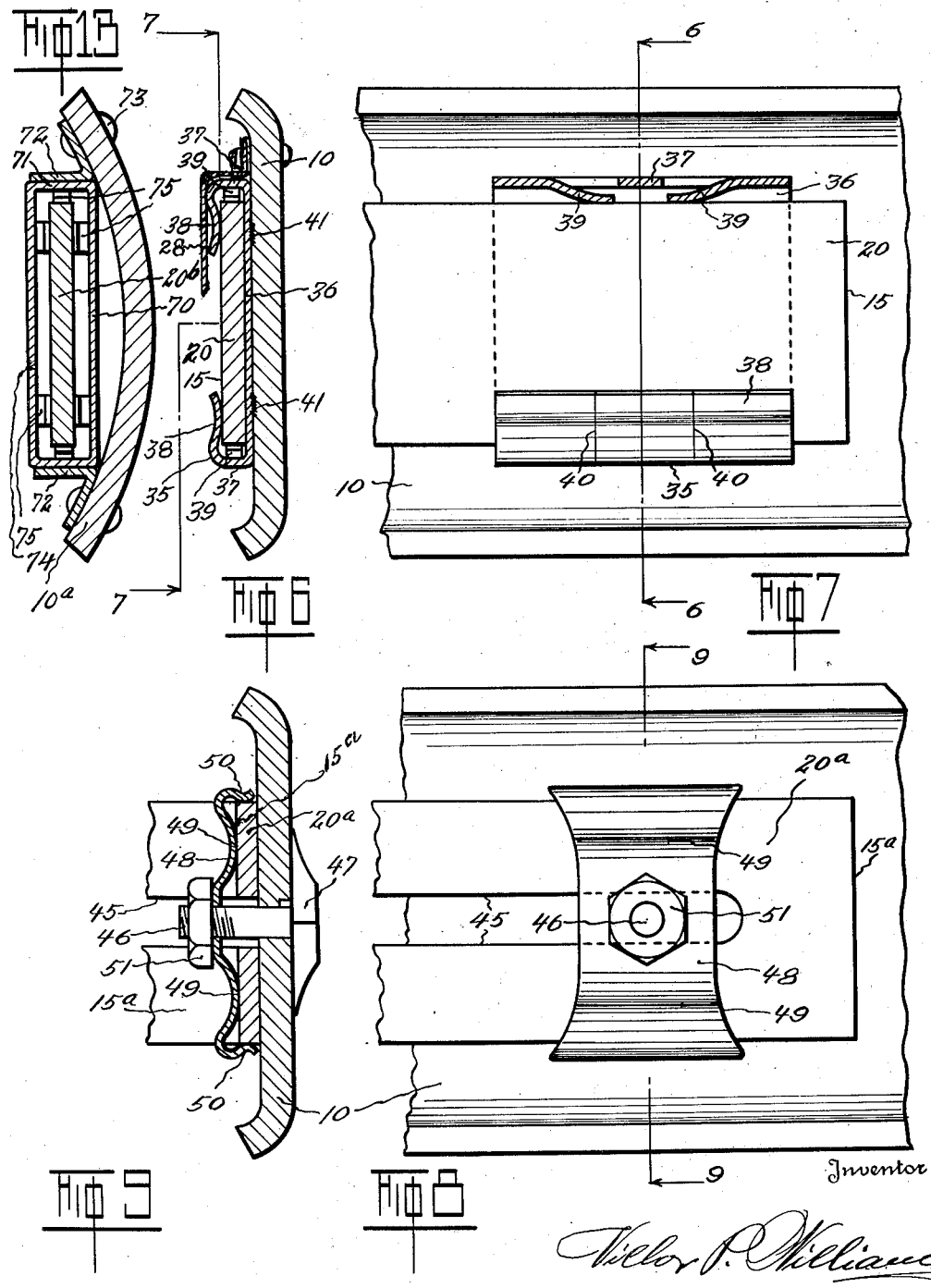

1,982,775

UNITED STATES PATENT OFFICE 1,982,775

BUMPER

Villor P. Williams, Baltimore, Md., assignor to Estelle P. Williams, Baltimore, Md.

Application May 7, 1934, Serial No. 724,402

24 Claims. (Cl. 293—55)

This invention relates to bumpers for automobiles and other vehicles and is a continuation in part of my copending application Serial No. 691,841, filed October 2, 1933, now Patent No. 1,957,515.

An object of this invention is to provide in a bumper a non-rattling and resilient connection between the ends of the spring bars and the impact bar slidably contacted thereby.

Another object of this invention is to provide in this connection an unlimited movement of the spring bars, with means for creating a frictional resistance to this movement.

A still further object of this invention is the provision of a bumper having a minimum bulk and by virtue of the non-rattling connection will permit the desired character of shock absorbing and buffer motion, the arrangement of parts being such as to entirely obviate any looseness and rattling.

An additional object of this invention resides in the preferable employment of a substantially rigid impact bar which may be made of a low carbon steel.

A further purpose is in the provision of a bumper that can be manufactured at a moderate cost and is easily applied to any type of vehicle, the bumper as herein contemplated being particularly adaptable for use with present day body design wherein the conventional chassis has been omitted as utilized in the so-called "Air flow" type automobiles.

These and like objects are accomplished by the simple and novel construction and arrangement of parts hereafter described and illustrated in the accompanying drawings forming a part thereof, and in which:—

Fig. 1 is a part plan view of one form of bumper.

Fig. 2 is a sectional detail view taken on line 2—2, Fig. 1, showing the manner of connection of the spring bar with the impact bar.

Fig. 3 is a rear view of this connection partly in section taken on line 3—3, Fig. 2.

Fig. 4 is a partial detail sectional view of the connection.

Fig. 5 is a perspective view of one of the resilient members employed in the connection.

Figs. 6—7 are views similar to Figs. 2 and 3. Fig. 6 shows in a modified form the connection with or without the clamping member (partly shown) attached thereon.

Figs. 8—9 are similar views of another modified form of connection.

Fig. 10 is a part plan view of another form of bumper.

Fig. 11 is a partial sectional view of a connection similar to that of Fig. 2 used as an end connection between the bars of the bumper.

Fig. 12 is a sectional view taken on line 12—12 in Fig. 10 of the center connection between the bars of the bumper.

Fig. 13 is a sectional view similar to that of Fig. 6 showing a still further modified form of connection.

Referring to Fig. 1 of the drawings there is shown a part plan view of a conventional form of bumper comprising a front main or impact bar 10 and a rear supporting bar 11 connected together in any suitable manner as at 12. The supporting bar 11 is shown separated at its center to permit the mounting of the pumper on an automobile having a V-type projecting radiator as is now more or less common in present day automobiles. It is of course understood that the bar 11 may be in one piece if so desired. Spanning the distance between the bars 10 and 11 which incidentally are arranged in the same plane are spring bars 13 rigidly connected at their center to the rear bar 11, in any suitable manner as at 14. Each of the spring bars 13 comprises spring arms 15 and 16 which are formed to slidably engage the inner side 17 of the impact bar 10, as clearly shown in Fig. 1. While only two spring bars 13 are shown utilized in the bumper it is to be understood that a greater number may be employed if so desired. In some cases only one such spring bar centrally arranged with respect to the bumper may be utilized.

The free ends 20 of the spring arms 15 and 16 are guided in suitable connections or housings 21 carried by the impact bar 10. Arranged on each of the longitudinal side edges of the end portions 20 of each of the spring arms is a resilient clip 22. These clips 22 are of channel shape and are preferably made as stampings of spring steel. Stamped out of the base of the channel comprising the clip 22 are a plurality of spring fingers 25, most clearly shown in Figs. 4 and 5. While only two spring fingers 25 are shown on a single clip it is to be understood that the number of spring fingers and length of clips may be varied as desired. The side walls 26 of the clip 22 are preferably formed with reentrant bows and are adapted to exert a resilient clamping action on the side faces of the spring arm when mounted thereon. If desired spring fingers similar to 25 may be struck out of the walls 26 for engagement with the side faces of the spring arm. The clips 22 are secured by rivets 27 or any other suitable means to a C-shaped clamping member 28, said member 28 being in turn permanently and rigidly attached to the inner side of the impact bar 10, by any suitable means as indicated at 29.

It is accordingly apparent that when the free ends 20 of the spring arms 15, 16 are inserted in the connecting means 21, the spring fingers 25 will resiliently and frictionally engage the longitudinal side edges of the spring arm ends 20. In a similar manner the resilient walls 26 of the clips 22 frictionally engage the side faces of the spring arm ends 20, said ends being thus resiliently, frictionally and slidably mounted in the connection 21. Impacts received by the impact bar 10 will compress the spring arms 15, 16 in the manner readily apparent, resulting in the sliding movement of the ends 20 of the spring arms in the connections. This sliding movement is unrestricted except for the frictional resistance set up by the spring fingers 25 and resilient walls 26, which frictional resistance aids in absorbing some energy of the impact.

In view of the resilient mounting of the ends 20 of the spring arms 15, 16 rattling of these parts is positively prevented.

In the assembly of the clamping member 28 to the impact bar 10, the resilient walls 26 of the clips 22 are tightly compressed, both against the side faces of the end of the spring arm and the inner sides of the impact bar and clamping member. In a similar manner, the width of the spring arms 15, 16 is such as to preferably compress the spring fingers 25 to a substantial extent whereby to increase the force which they exert on said spring arms. If desired the resilient side walls 26 of the clips 22 may be transversely split as at 30, so that, the same may more readily seat and adapt itself to the spring arms.

In Figs. 6 and 7 there is disclosed a modified form of connecting means. In this form shown in Fig. 6, the clamping member 28 shown in Fig. 2, is sectionaly only partly disclosed. Clamping member 28 may be employed in the connection of Fig. 6 to be rigidly attached to the inner side of the impact bar 10, or if desired it may be wholly dispensed with. The connecting means comprises a resilient clip 35 of somewhat C-shaped form. This clip 35 is also made preferably of spring steel, or any metal stamping and comprises a back wall 36, side walls 37, and resilient legs 38 arranged in spaced relation to the back wall 36 and extending towards each other. Each of the side walls 37 has struck out therefrom, spring fingers 39, which as clearly shown in Fig. 7 extend inwardly of the clip. The resilient legs 38 may each be transversely split, as at 40, and if desired wall 36 may have struck out therefrom spring fingers similar to those shown at 39 and 25.

The clip 35 may be permanently fastened to the inner side of the impact bar 10 in any suitable manner, preferably as shown in Fig. 6 by the spot welds 41.

The operation and function of the clip 35 as a connecting member is similar in all respects, to that shown in Figs. 1 to 5. Rattling of the spring arms 15, 16 is wholly prevented by the spring fingers 39 and resilient legs 38, all of which act to impart a frictional resistance to the sliding movement of the ends 20 of the spring arms. It is also obvious from the showing in Figs. 6 and 7 that the sliding or longitudinal movement of the ends 20 of the spring arms is unrestricted, the degree of movement depending on the amount the spring arms are compressed by impacts on the impact bar.

In Figs. 8 and 9 there is illustrated still another modified form of connection. In this form, the spring arms of the bumper, only one of which is shown at 15$^a$, is provided with a longitudinally extending centrally disposed slot 45, of such a length as to permit unrestricted sliding of the end 20$^a$ of the spring arm 15$^a$ as hereinafter to be described. Suitably located on the impact bar 10, is a bolt 46, the head 47 of which may be of fanciful design, engaging the outer surface of the impact bar, said bolt 46 extending through the slot 45 of the spring arm.

Mounted on the bolt 46 is a substantially bowed C-shaped spring clip 48, so shaped as to provide spaced convex abutments 49, and resilient legs 50, parallelly arranged with respect to each other, both of said legs 50 being directed towards the inner side of the impact bar 10. As shown in Fig. 9 the convex abutments 49 of the clip 48 engage the outer side of the spring arm 15$^a$, while the resilient legs 50 thereof engage the longitudinal side edges of said spring arm. By taking up on the nut 51 the degree of compression placed on the clip 48 can be regulated. In some cases this adjusting feature can be dispensed with, the bolt 46 in that case being replaced by a rivet and the clip 48 being accordingly then placed under an initial compression which substantially remains constant throughout the life of the bumper. In order to provide the required flexibility of movement of the spring arm 15$^a$ relative to the impact bar, the slot 45 is made of a width slightly greater than the diameter of the bolt or rivet 46.

Again the characteristics inherent in the preceding forms of described connections are possessed by the connection of Figs. 8 and 9. Rattling of the spring arms is positively prevented by the resilient clip 48. The end 20$^a$ of the spring arm 15$^a$ is tightly pressed against the inner face of the impact bar 10 by the clip 48, the frictional resistance to movement of the end 20$^a$ being set up by the contacting surfaces of the end 20$^a$ with the impact bar, the engagement of the abutments 49 with the side face of the end 20$^a$, and the engagement of the resilient legs 50 with the longitudinal side edges of the end 20$^a$ of the spring arm 15$^a$. If desired spring fingers such as 25 and 39 may be formed on the resilient legs 50 of the clip 48 to engage the longitudinal side edges of the spring arms 15$^a$.

While in each of the above described modified forms, the connections are shown mounted on the impact bar 10 upon which the free ends of the spring arms slidably move; it is obvious that this arrangement may be reversed. That is, the spring bars 13 may be rigidly connected to the impact bar 10, the spring arms 15, 16 then slidably engaging and being connected to the supporting or rear bar 11.

The invention as above described may be equally as well utilized with an impact bar of the type comprising a plurality of spaced separate bars, connected together to act as a unit, of the type well known.

With the employment of spring bars such as 13, in a bumper it is not necessary that the impact bar be made of spring steel. Preferably, the impact bar is made rigid, that is, non-yielding and of a low carbon steel.

With connections of the various types as described above, a bumper of exceedingly simple construction and economy of manufacture may be fabricated. Such a bumper is disclosed in Figs. 10, 11 and 12. In this modified form of bumper, there is provided an impact bar 60. Secured to the impact bar 60 and in the same plane therewith are the spring bars 62 and 63. The intermediate portions of the spring bars 62 and 63 are flattened as at 68 for attachment to the frame members of the vehicle. The spring bars 62 and 63 are unitarily associated with the impact bar 60 through the medium of the connections 21 which are identical in all respects with those shown in Figs. 1 to 5. Referring to Fig. 10 it will be observed that the free ends of the spring arms 64 are connected to the impact bar 60 adjacent the ends thereof, the connections 21 being the sole means of connection between the impact bar and the spring bars at these points. At the centre of the impact bar 60 the free ends of the spring arms 65—65 overlap in surface contact with each other and the impact bar, all being retained in operative engagement by a connection 21ª, that differs from the connection 21 only in that it is of a larger size to accommodate the overlapping ends of the spring arms 65—65, as clearly shown in Fig. 12.

It is to be appreciated that the connections 21 and 21ª along with the resilient clips therein are of sufficient strength and rigidity to securely hold the bumper parts together. In view of the novel manner of guiding and supporting the free ends of the spring arms rattling and looseness of parts is wholly prevented as described above.

In the operation of the bumper, impacts upon the impact bar 60 will cause the spring bars 62, 63 to be compressed. The free ends of the spring arms 64, will slide through the connections 21, while the free ends of the spring arms 65—65 will slide relative to each other through the connection 21ª. With this functional operation of the bumper parts along with the frictional resistance set up by the resilient clips upon the movement of the free ends of the spring arms, shocks received by the bumper will be most efficiently absorbed to a remarkable degree.

It is to be further understood that the modified connections shown in Figs. 6, 7, 8 and 9 may be used in the bumper of Fig. 10, instead of the connections 21 and 21ª.

Referring to Fig. 13, there is shown a still further modified form of connection, wherein the spring arm is engaged on all sides by the spring means carried by the connection. Adapted to be attached to an impact bar 10ª, which in this case is shown to be of conventional convex curvature, is a tubular support 70 preferably made of spring steel which has attached to the ends 71 thereof in any suitable manner ears 72 which, through the medium of rivets 73 or any other suitable means, permanently secure the tubular support 70 to the impact bar 10ª. Struck out from the ends 71 and sides 74 of the tubular support 70 are spring fingers 75, similar in all respects to the spring fingers 39, see Fig. 7, which spring fingers 75 engage, as shown in Fig. 13, the longitudinal side edges and inner and outer side faces of the spring arm 20ᵇ. With a construction as above described the spring arm end 20ᵇ is in a sense floatingly mounted in the tubular support 70, the action of the spring fingers 75 thereon being in all respects similar to those as described hereinabove.

While various embodiments of the invention have been illustrated and described it must be understood that the same may be modified and constructed in other ways within the scope of the appended claims.

I claim:—

1. A bumper comprising an inner member and an outer member, a plurality of spring arms associated with one of said members and each having an end thereof slidably connected to the other of said members, each of said connections comprising resilient guide means engaging the longitudinal side edges of said spring arms and means for restraining separating movement of said spring arms relative to said resilient guide means and said outer member.

2. A bumper comprising an inner member and an outer member, a plurality of spring arms associated with one of said members and each having an end thereof slidably connected to the other of said members, and resilient means in each of said connections engaging the longitudinal side edges of said spring arms and at least one of the side faces thereof.

3. A bumper comprising an inner member and an outer member, a plurality of spring arms associated with one of said members and each having an end thereof slidably connected to the other of said members, and means in each of said connections in engagement with the longitudinal side edges of said spring arms and at least one of the side faces thereof for yieldingly resisting vibratory movements of said spring arms.

4. A bumper comprising an inner member and an outer member, a plurality of spring arms associated with one of said members and each having a portion thereof slidably connected to the other of said members, means carried by said other of said members and engaging the longitudinal side edges and at least one of the side faces of each of said spring arms for preventing vibratory movements of said spring arms.

5. A bumper comprising an inner member and an outer member, a plurality of spring arms fixed at one end to one of said members and at the other end slidably connected to the other of said members, said connection comprising resilient guide means carried by said other of said members and engaging the longitudinal side edges of said spring arms and means restraining separating movement of said spring arms relative to said other of said members.

6. A bumper comprising an inner member and an outer member, a plurality of spring arms associated with one of said members and each having a portion thereof slidably connected to the other of said members, means carried by said other of said members and engaging the longitudinal side edges and at least one of the side faces of each of said spring arms for frictionally resisting sliding movement of said spring arms relative to said other of said members.

7. The bumper structure as specified in claim 6, said means additionally resisting vibratory movements of said spring arms.

8. A bumper comprising an inner member and an outer member, a plurality of spring arms associated with one of said members and each having a portion thereof slidably connected to the other of said members, means carried by said other of said members for frictionally resisting sliding movement of said spring arms and means associated with said first mentioned means for resisting vibratory movements of said spring arms.

9. In a bumper, a spring arm member and a bar member slidably engaged thereby, a connection between said members comprising a clamping member rigidly secured to said bar member, and resilient clips attached in spaced relation to said clamping member and each adapted to receive therein a longitudinal side edge of said spring arm.

10. In a bumper, a spring arm member and a bar member, a connection between said members comprising a clamping member rigidly secured to said bar member, resilient clips of channel form attached in spaced opposed relation to said clamping member, said spring arm member being slidably mounted in said resilient clips and resiliently supported thereby.

11. In a bumper, a spring arm member and a bar member, a connection between said members comprising a clamping member rigidly secured to said bar member, resilient clips of channel form attached in spaced opposed relation to said clamping member, inwardly disposed spring fingers struck out of said clips, said spring arm member being slidably mounted in said resilient clips and resiliently supported by said spring fingers.

12. The structure as specified in claim 11, and said resilient clips having sides each resiliently engaging a side of said spring arm member.

13. In a bumper, a spring arm member and a bar member, a connection between said members comprising a resilient clip secured to said bar member and adapted to receive therein for sliding engagement said spring arm member, resilient means on said clip engaging the longitudinal side edges of said spring arm member and additional means on said clip engaging a side face of said spring arm member.

14. In a bumper, a spring arm member and a bar member, a connection between said members comprising a resilient clip of channel form secured at its base to said bar member, spring fingers struck out of each of the legs of said clip and oppositely disposed with respect to each other, said spring arm member slidably mounted in said clip, the longitudinal side edges thereof being resiliently engaged by said spring fingers, and means on each of the legs of said clip engaging a side face of said spring arm member.

15. In a bumper, a spring arm member and a bar member, a connection between said members comprising a resilient clip of channel form secured at its base to said bar member, spring fingers struck out of each of the legs of said clip and oppositely disposed with respect to each other, said spring arm member slidably mounted in said clip, the longitudinal side edges thereof being resiliently engaged by said spring fingers, and resilient means integral with each of the legs of said clip engaging a side face of said spring arm member to urge the same into contact with the base of said clip.

16. In a bumper, a spring arm member and a bar member, said spring arm member being longitudinally slotted, a connection between said members comprising a bolt mounted on said bar member and projecting through the slotted spring arm member, a resilient clip fitted on said bolt including means resiliently restraining lateral and vertical movements of said spring arm member relative to said bar member.

17. In a bumper, a spring arm member and a bar member, said spring arm member being longitudinally slotted, a connection between said members comprising a resilient clip provided with a resilient intermediate portion adapted to engage a side face of said spring arm member and resilient end portions adapted to each engage a longitudinal side edge of said spring arm member, and means carried by said bar member and extending through the slotted spring arm member and said clip for compressing the same to resiliently maintain said spring arm member in engagement with said bar member.

18. The structure as specified in claim 17, the width of said slot in the spring arm member being greater than the means extended therethrough whereby up and down movement of said spring arm member against the resilient action of said clip end portions is permitted.

19. In a bumper, a bar member and a spring arm member having a free end portion slidably engaging said bar member adjacent an end thereof, means connecting said members comprising resilient and friction producing means attached to said bar member for movement therewith, said resilient and friction producing means guiding said free end portion and engaging the same on the longitudinal side edges thereof and on at least one side face thereof.

20. In a bumper, a bar member and a spring arm member having a free end portion slidably engaging said bar member adjacent an end thereof, clip means connecting said members comprising resilient and friction producing means unitarily associated therewith and attached to said bar member, said free end portion being slidably mounted in said clip for guiding movement thereby, said resilient and friction producing means engaging said free end portion on the longitudinal side edges thereof and on at least one side face thereof.

21. In a bumper, an outer member, a supporting member, a spring arm associated with one of said members and having an end portion thereof slidably connected with said other member, a housing attached to said other member adapted to receive the end portion of said spring arm, and means within said housing for producing frictional resistance to the sliding and vibratory movements of said spring arm.

22. In a bumper, a main bar, a back bar, a spring arm on one of said bars having an end portion thereof slidably connected with the other bar, a housing attached to said other bar adapted to receive the end portion of said spring arm, and resilient means within said housing for frictionally resisting sliding and vibratory movements of said spring arm.

23. In a bumper, a main bar, a back bar, a spring arm on one of said bars slidably connected with the other bar, a housing attached to said other bar adapted to receive the end portion of said spring arm, and resilient means within said housing for producing a frictional resistance to the sliding and vibratory movements of said spring arm, said resilient means in the normal relationship of parts being only partially compressed, further compression thereof occuring upon movement of said main bar under impact.

24. In a bumper, a main bar, a back bar, a spring arm on one of said bars having an end portion slidably connected with the other bar, and resilient means carried by said other bar and engaging opposite sides of said spring arm for producing a frictional resistance to the sliding and vibratory movements of said spring arm.

VILLOR P. WILLIAMS.